(12) United States Patent
Lin et al.

(10) Patent No.: US 8,241,412 B2
(45) Date of Patent: Aug. 14, 2012

(54) FILTER INSPECTION WITH A GAS MIXING APPARATUS

(75) Inventors: Shin-In Lin, Tainan (TW); Chi-Hung Lin, Keelung (TW); Ming-Chuan Hu, Taipei County (TW); Xiao-Yong Hsu, Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 698 days.

(21) Appl. No.: 12/345,643

(22) Filed: Dec. 29, 2008

(65) Prior Publication Data

US 2010/0154513 A1 Jun. 24, 2010

(30) Foreign Application Priority Data

Dec. 22, 2008 (TW) .............................. 97150138 A

(51) Int. Cl.
*B01D 49/00* (2006.01)
(52) U.S. Cl. ................ 96/413; 55/410; 55/413; 55/416; 55/422; 55/487
(58) Field of Classification Search ............ 55/416, 55/487, 410, 413, 418, 422–423; 73/38, 73/23.2, 31.06, 31.05
See application file for complete search history.

(56) References Cited

U.S. PATENT DOCUMENTS

| 4,382,378 A | * | 5/1983 | Wadsworth et al. | 73/38 |
| 5,255,716 A | | 10/1993 | Wilcox | |
| 5,602,324 A | * | 2/1997 | Yanagida et al. | 73/23.2 |
| 5,939,617 A | * | 8/1999 | Lim et al. | 73/38 |
| 2005/0091878 A1 | * | 5/2005 | Yang et al. | 34/549 |

FOREIGN PATENT DOCUMENTS

| TW | 300316 | 3/1997 |
| TW | 369598 | 9/1999 |

* cited by examiner

*Primary Examiner* — Jason M Greene
*Assistant Examiner* — Karla Hawkins
(74) *Attorney, Agent, or Firm* — Jianq Chyun IP Office

(57) ABSTRACT

A gas mixing apparatus including a chamber, a filter, a gas transmitting unit and a porous layer is provided. The chamber includes a gas inlet and a gas outlet. The filter, which has at least one opening, is disposed at the gas outlet of the chamber. An environmental gas outside the chamber is filtered and becomes a clean gas after flowing through the filter into the chamber. The gas transmitting unit is connected to the opening of the filter to transmit a gas to be mixed into the chamber through the opening. The porous layer is disposed at the gas outlet. The gas to be mixed is mixed with the clean gas and leaves the chamber through the porous layer.

15 Claims, 2 Drawing Sheets

FILTER INSPECTION WITH A GAS MIXING APPARATUS

CROSS-REFERENCE TO RELATED APPLICATION

This application claims the priority benefit of Taiwan application serial no. 97150138, filed on Dec. 22, 2008. The entirety of the above-mentioned patent application is hereby incorporated by reference herein and made a part of specification.

BACKGROUND OF THE INVENTION

1. Field of the Invention

The present invention relates to an inspection system for inspecting efficiency of a filter, and more particularly to a gas mixing apparatus of an inspection system for inspecting efficiency of a filter.

2. Description of Related Art

Manufacturing of electronic devices are usually performed in clean rooms. This is mainly because if particles in a working environment attach to products during manufacturing, damages to the products are caused, thereby lowering yields of manufacturing and increasing manufacturing costs for manufacturers. Therefore, a number of the particles included in the environment of a manufacturing place of the electronic devices must comply with a certain standard, so as to lower chances of the particles attaching to the products. On the other hand, persons must wear clean suits in the clean room. The clean suits insulate particles on the persons or other contaminants from entering the clean room and causing contamination. Insulating effects of the clean suits are determined by a particle filtering efficiency of the clean suits. Hence, inspecting the particle filtering efficiency of the filters is an important issue in manufacturing of clean suits.

Generally, the particle filtering efficiency of the filter must comply with certain inspecting standards. For example, the Institut für Textil in Germany uses the VDI guideline 3926 type 2, which mainly performs inspecting using a method of loads of particles, as a basis, while the Institute of Environmental Sciences and Technology in America performs inspecting according to the IEST-RP-CC003.3 inspecting standard. Relating to inspecting methods and devices for inspecting the particle filtering efficiency of the filters, currently related patents such as Taiwan Patent No. 369598 and U.S. Pat. No. 5,255,716 have been presented. However, prior art inspecting technologies are not suitable for application in inspecting the particle filtering efficiency of the filter used in the clean rooms. This is mainly because an inspecting gas used has a particle concentration higher than a particle concentration in a clean indoor environment during inspecting, thereby being not in compliance with working environments of common clean rooms, causing inspecting results to be different from real situations.

SUMMARY OF THE INVENTION

The present invention provides a gas mixing apparatus which dilutes a gas to be mixed.

The present invention provides an inspection system for inspecting efficiency of a filter having the above-mentioned gas mixing apparatus.

The present invention provides a gas mixing apparatus including a chamber, a filter, a gas transmitting unit, and a porous layer. The chamber includes a gas inlet and a gas outlet. The filter is disposed at the gas outlet of the chamber and has at least one opening. An environmental gas outside the chamber is filtered and becomes a clean gas after flowing through the filter into the chamber. The gas transmitting unit is connected to the opening of the filter to transmit the gas to be mixed into the chamber through the opening. The porous layer is disposed at the gas outlet of the chamber, and the gas to be mixed is mixed with the clean gas and then leaves the chamber through the porous layer.

The present invention further provides an inspection system for inspecting efficiency of a filter. The inspection system includes the above-mentioned gas mixing apparatus, a sampling chamber, an upstream sampling unit, a downstream sampling unit, a particle counter, and a control unit. The sampling chamber is connected to the gas outlet of the chamber, and a filter to be inspected is fixed in the sampling chamber and separates the sampling chamber into an upstream sampling area and a downstream sampling area. The upstream sampling unit samples a gas in the upstream sampling area, and the downstream sampling unit samples a gas in the downstream sampling area. In addition, the control unit is connected to the sampling chamber, the upstream sampling unit, the downstream sampling unit and the particle counter. Through control by the control unit, the particle counter respectively measures a number of the particles in samples obtained by the upstream sampling unit and by the downstream sampling unit.

According to an embodiment of the present invention, the above gas transmitting unit includes a gas input pipe and a flow adjusting valve. The flow adjusting valve is disposed on the gas input pipe to control a flowrate of the gases to be mixed.

According to an embodiment of the present invention, the filter has a plurality of above openings. The gas input pipe has a plurality of branch tubes, and a number of the openings is same as a number of the branch tubes.

According to an embodiment of the present invention, the above porous layer is a rectifying porous layer.

According to an embodiment of the present invention, the above sampling chamber has a gas extracting unit to make the gas mixed by the gas mixing apparatus become filtered by the filter to be inspected.

According to an embodiment of the present invention, the above gas extracting unit is electrically connected to the control unit.

According to an embodiment of the present invention, the above gas extracting unit includes a blower and a flow-meter. The blower and the flow-meter are both disposed on the sampling chamber.

According to an embodiment of the present invention, the above control unit has a frequency converter, and the frequency converter is electrically connected to the gas extracting unit.

According to an embodiment of the present invention, the above upstream sampling unit includes an upstream sampling tube, and the downstream sampling unit includes a downstream sampling tube. The control unit has a switching element, and the switching element is coupled between the upstream sampling tube, the downstream sampling tube and the particle counter. Through switching by the switching element, the particle counter respectively measures the number of the particles in the samples obtained by the upstream sampling tube and the downstream sampling tube.

According to an embodiment of the present invention, the above switching element includes an electromagnetic valve.

According to an embodiment of the present invention, the inspection system for inspecting efficiency of a filter further includes a pressure gauge which is coupled between the upstream sampling area and the downstream sampling area to measure a pressure difference between the upstream sampling area and the downstream sampling area.

Due to the above, the gas mixing apparatus of the present invention effectively uses the environmental gas to dilute the gas to be mixed. Hence, the gas mixing apparatus and the inspection system of the present invention have better practicality.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
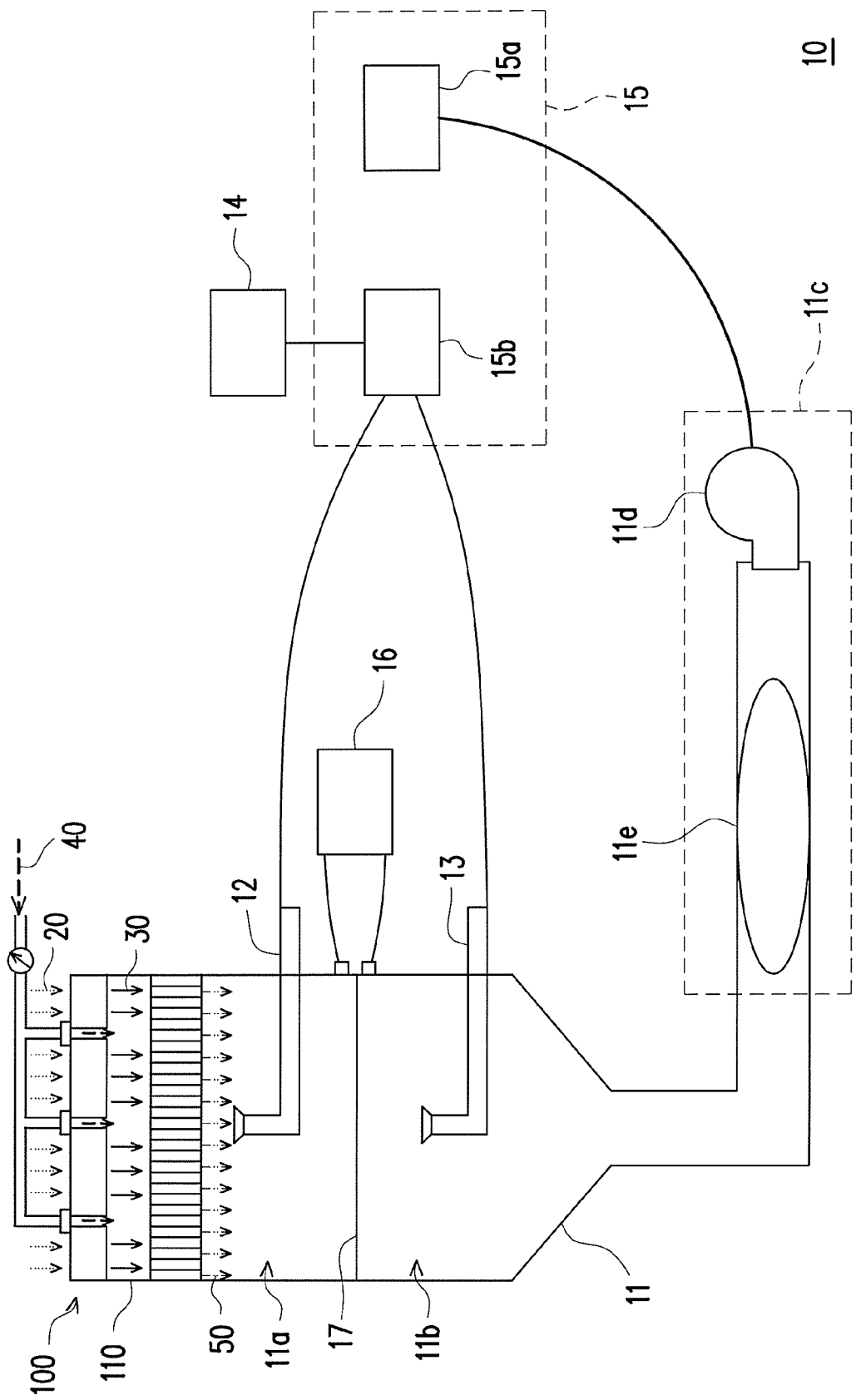
FIG. 1 is a schematic diagram showing an inspection system for inspecting efficiency of a filter according to an embodiment of the present invention.

FIG. 1 is a schematic diagram showing an inspection system for inspecting efficiency of a filter according to an embodiment of the present invention. Referring to FIG. 1, an inspection system 10 for inspecting efficiency of a filter according to the present embodiment includes a gas mixing apparatus 100. The following illustrates the gas mixing apparatus 100 in detail.

Figure 2:
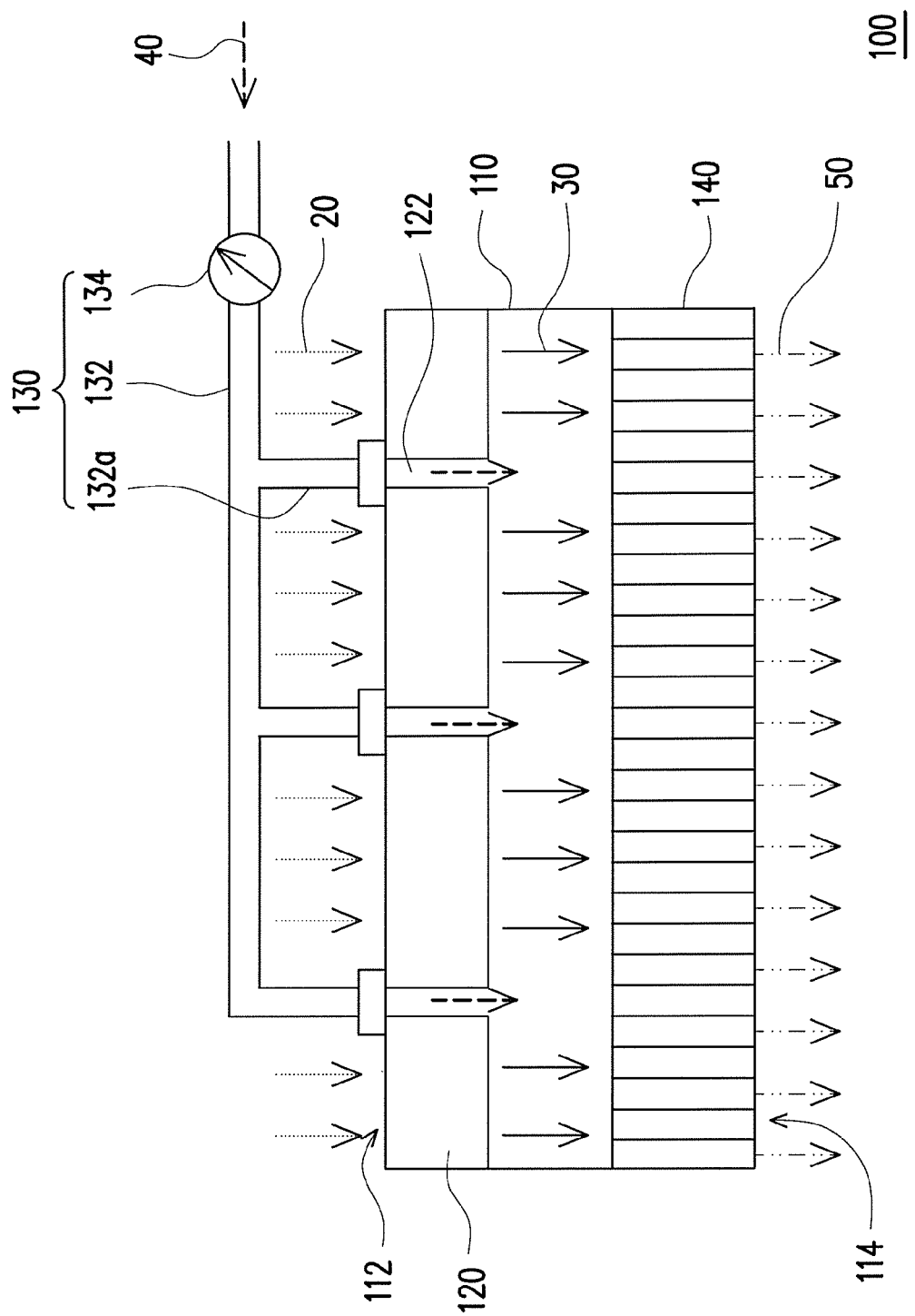
FIG. 2 is a schematic diagram showing a gas mixing apparatus of an inspection system for inspecting efficiency of a filter in FIG. 1.

FIG. 2 is a schematic diagram showing a gas mixing apparatus of an inspection system for inspecting efficiency of a filter in FIG. 1. Referring to FIG. 2, the gas mixing apparatus 100 according to the present embodiment includes a chamber 110, a filter 120, a gas transmitting unit 130 and a porous layer 140. The chamber 110 includes a gas inlet 112 and a gas outlet 114. The filter 120 is disposed at the gas outlet 112 of the chamber 110. The filter 120 may be a high efficiency filter having a honeycomb structure or filters of other forms. When an environmental gas 20 (such as atmosphere) enters the chamber 110 through the filter 120, particles in the environmental gas 20 are filtered by the filter 120, so that the environmental gas 20 filtered by the filter 120 has a lowered particle concentration and becomes a clean gas 30.

The filter 120 has at least one opening 122, and the gas transmitting unit 130 is connected to the opening 122 of the filter 120. In other words, the gas transmitting unit 130 transmits a gas to be mixed 40 into the chamber 110 through the opening 122. According to the present embodiment, the gas transmitting unit 130 includes a gas input pipe 132 and a flow adjusting valve 134 disposed on the gas input pipe 132. The flow adjusting valve 134 is used to control a flowrate of the gas to be mixed 40. The gas input pipe 132 has a plurality of branch tubes 132a, and a number of the branch tubes is same as a number of the opening 122, and each of the branch tubes 132a is connected to the corresponding opening 122.

The above gas to be mixed is, for example, a gas having a high particle concentration, and a source of particles in the gas to be mixed 40 is, for example, aerosol. After the gas to be mixed 40 having the high particle concentration is transmitted to the chamber 110, it is mixed with the clean gas 30 in the chamber 110 and is diluted. Generally, the particle concentration in the gas to be mixed 40 is thereby lowered. An inspecting gas 50 after mixing leaves the chamber 110 through the porous layer 140 of the gas outlet 114 of the chamber 110. In addition, a user may control a flowrate of the gas to be mixed 40 entering the chamber 110 through the flow adjusting valve 134, so as to adjust a particle concentration of the inspecting gas 50. According to the present embodiment, the porous layer 140 is a rectifying porous layer and may have a plurality of parallel channels. When the inspecting gas 50 leaves the chamber 110 through the porous layer 140, the parallel channels provides a rectifying effect, so as to maintain a steady and even speed of gas flow.

The gas mixing apparatus 100 according to the present invention is mainly used to dilute or adjust the particle concentration in the gas, but according to other embodiments that are not illustrated, the gas mixing apparatus 100 may be further used to adjust a molar concentration or a weight percentage concentration of the gas. The present invention is not hereby limited.

Still referring to FIG. 1, in addition to the above gas mixing apparatus 100, the inspection system 10 for inspecting efficiency of a filter according to the present embodiment further includes a sampling chamber 11, an upstream sampling unit 12, a downstream sampling unit 13, a particle counter 14 and a control unit 15. The sampling chamber 11 is connected to the gas outlet 114 of the gas mixing apparatus 100 (as shown in FIG. 2) and has a gas extracting unit 11c. The gas extracting unit 11c includes a blower 11d and a flow-meter 11e, and both the blower 11d and the flow-meter 11e are disposed on the sampling chamber 11. When inspection system 10 is used to inspect efficiency of a filter to be inspected 17, the filter to be inspected 17 is required to be fixed in the sampling chamber 11. The sampling chamber 11 is thereby separated by the filter to be inspected 17 into an upstream sampling area 11a and a downstream sampling area 11b.

According to the present embodiment, the upstream sampling unit 12 and the downstream sampling unit 13 respectively samples the gas in the upstream sampling area 11a and of the gas in the downstream sampling area 11b. The control unit 15 is connected to the above sampling chamber 11, the upstream sampling unit 12, the downstream sampling unit 13 and the particle counter 14. In addition, the control unit 15 further has a frequency converter 15a and a switching element 15b. The gas extracting unit 11c is electrically connected to the frequency converter 15a of the control unit 15.

When inspecting the particle filtering efficiency of the filter, the gas extracting unit 11c makes the inspecting gas 50 mixed and diluted by the gas mixing apparatus 100 (as shown in FIG. 2) enter the upstream sampling area 11a of the sampling chamber 11 and pass through the filter 17 to the downstream sampling area 11b. Generally, when the inspecting gas 50 passes through the filter to be inspected 17, the particles in the inspecting gas 50 are filtered by the filter to be inspected 17 and are retained on an upper surface of the filter to be inspected 17. At the moment, the flowrate of the inspecting gas 50 is affected by the particles accumulated on the filter to be inspected 17, so that the pressure in the upstream sampling area 11a is larger than the pressure in the downstream sampling area 11b, and as the particles accumulate on the upper surface of the filter to be inspected 17, a difference in the pressure between the upstream sampling area 11a and the downstream sampling area 11b increases. In other words, the greater the difference between the pressure in the upstream sampling area 11a and the pressure in the downstream sampling area 11b, the higher the particle filtering efficiency of the filter to be inspected 17.

The inspection system for inspecting efficiency of a filter 10 according to the present embodiment further includes a pressure gauge 16 connected between the upstream sampling area 11a and the downstream sampling area 11b. The user may obtain a difference in the pressure between the upstream sampling area 11a and the downstream sampling area 11b through measurement by the pressure gauge 16. Furthermore, the user may use the frequency converter 15a to control a motor speed of the blower 11d of the air extracting unit 11c, so as to adjust the difference in the pressure between the upstream sampling area 11a and the downstream sampling area 11b and the flowrate of the gas when the upstream sampling unit 12 and the downstream sampling unit 13 are sampling.

In addition, the upstream sampling unit 12 is, for example, an upstream sampling tube, and the downstream sampling unit 12 is, for example, a downstream sampling tube. The switching element 15b of the above control unit 15 may be a electromagnetic valve coupled between the upstream sampling tube, the downstream sampling tube and the particle counter 14. By switching operation through the switching element 15b, the user may make the particle counter 14 measure the number of particles in the sample in the upstream sampling tube or the downstream sampling tube.

It should be noted that the inspection system for inspecting efficiency of a filter 10 according to the present embodiment adjusts a concentration of the inspecting gas 50 entering the sampling chamber 11 by changing the flowrate of the gas in the sampling chamber 11. When the speed of flow of the gas in the sampling chamber 11 is higher, the environmental gas flows into the chamber 110 more easily to become the clean gas 30 due to convection. An increase in the clean gas 30 thereby increases a dilution ratio of the gas to be mixed 40, achieving a purpose of adjusting the particle concentration of the inspecting gas 50.

In summary, the gas mixing apparatus of the present invention filters the environmental gas to make it the clean gas, and uses the clean gas to effectively dilute the gas to be mixed. According to some of the embodiments of the present invention, the gas mixing device further provides the rectifying effect, so that the inspecting gas after mixing maintains an even concentration, stable and even wind speed, and accuracy during sampling is increased. Moreover, according to some of the embodiments of the present embodiment, the inspection system for inspecting efficiency of a filter makes the particle concentration of the inspecting gas comply with a particle concentration in an environment of a clean room through the gas mixing apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A gas mixing apparatus, comprising:
   a chamber having a gas inlet and a gas outlet;
   a filter disposed at the gas inlet of the chamber, wherein the filter has at least one opening, and after passing through the filter into the chamber, an environmental gas is filtered to become a clean gas;
   a gas transmitting unit connected to the opening of the filter, so as to transmit a gas to be mixed into the chamber through the opening, wherein the gas to be mixed bypasses the filter through the opening, and is mixed with the clean gas in the chamber; and
   a porous layer disposed at the gas outlet, wherein the gas to be mixed is mixed with the clean gas and then leaves the chamber through the porous layer.

2. The gas mixing apparatus of claim 1, wherein the gas transmitting unit comprises:
   a gas input pipe; and
   a flow adjusting valve disposed on the gas input pipe to control a flowrate of the gas to be mixed.

3. The gas mixing apparatus of claim 2, wherein the filter has a plurality of openings, the gas input pipe comprises a plurality of branches, and a number of the openings is same as a number of the branches.

4. The gas mixing apparatus of claim 1, wherein the porous layer is a rectifying porous layer for rectifying a gas leaving the chamber through the porous layer to a steady and speed-even gas.

5. An inspection system for inspecting efficiency of a filter, comprising:
   a gas mixing apparatus of claim 1;
   a sampling chamber connected to the gas outlet of the chamber, wherein a filter to be inspected is fixed in the sampling chamber and separates the sampling chamber into an upstream sampling area and a downstream sampling area;
   an upstream sampling unit for sampling a gas in the upstream sampling area;
   a downstream sampling unit for sampling a gas in the downstream sampling area;
   a particle counter; and
   a control unit connected to the sampling chamber, the upstream sampling unit, the downstream sampling unit and the particle counter, wherein through control by the control unit, the particle counter measures numbers of particles in samples sampled by the upstream sampling unit and by the downstream sampling unit.

6. The inspection system of claim 5, wherein the gas transmitting unit comprises:
   a gas input pipe; and
   a flow adjusting valve disposed on the gas input pipe to control a flowrate of the gas to be mixed.

7. The inspection system of claim 6, wherein the filter has a plurality of openings, the gas input pipe comprises a plurality of branches, and a number of the openings is same as a number of the branches.

8. The inspection system of claim 5, wherein the porous layer is a rectifying porous layer for rectifying a gas leaving the chamber through the porous layer to a steady and speed-even gas.

9. The inspection system of claim 5, wherein the sampling chamber comprises a gas extracting unit to make the gas mixed by the gas mixing apparatus filtered by the filter.

10. The inspection system of claim 9, wherein the gas transmitting unit is electrically connected to the control unit.

11. The inspection system of claim 9, wherein the gas transmitting unit comprises:
    a blower disposed on the sampling chamber; and
    a flow-meter disposed on the sampling chamber.

12. The inspection system of claim 9, wherein the control unit comprises a frequency converter and the frequency converter is electrically connected to the gas extracting unit.

13. The inspection system of claim 5, wherein the upstream sampling unit comprises an upstream sampling tube, the downstream sampling unit comprises a downstream sampling tube, the control unit comprises a switching element, the switching element is coupled between the upstream sampling tube, the downstream sampling tube and the particle counter, and through switching of the switching element, the particle counter respectively measures the numbers of the particles in the samples in the upstream sampling tube and in the downstream sampling tube.

14. The inspection system of claim 13, wherein the switching element comprises an electromagnetic valve.

15. The inspection system of claim 5, further comprising a pressure gauge coupled between the upstream sampling area and the downstream sampling area to measure a pressure difference between the upstream sampling area and the downstream sampling area.

\* \* \* \* \*